(12) United States Patent
Okuyama et al.

(10) Patent No.: US 12,261,485 B2
(45) Date of Patent: Mar. 25, 2025

(54) ROTOR WITH PERMANENT MAGNETS HAVING DIFFERENT COERCIVE FORCES

(71) Applicant: DAIKIN INDUSTRIES, LTD., Osaka (JP)

(72) Inventors: Yoshitaka Okuyama, Osaka (JP); Masaki Hirano, Osaka (JP); Shoujirou Naka, Osaka (JP); Shunsuke Shimizu, Osaka (JP); Yoshiki Yasuda, Osaka (JP); Akio Yamagiwa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 261 days.

(21) Appl. No.: 17/754,120

(22) PCT Filed: Sep. 24, 2020

(86) PCT No.: PCT/JP2020/036117
§ 371 (c)(1),
(2) Date: Mar. 24, 2022

(87) PCT Pub. No.: WO2021/065687
PCT Pub. Date: Apr. 8, 2021

(65) Prior Publication Data
US 2022/0294289 A1 Sep. 15, 2022

(30) Foreign Application Priority Data
Sep. 30, 2019 (JP) .................. 2019-181001

(51) Int. Cl.
*H02K 1/276* (2022.01)
*H02K 21/16* (2006.01)
*H02K 29/03* (2006.01)

(52) U.S. Cl.
CPC ........... *H02K 1/2766* (2013.01); *H02K 21/16* (2013.01); *H02K 29/03* (2013.01)

(58) Field of Classification Search
CPC ...... H02K 1/2766; H02K 12/16; H02K 29/03; H02K 1/276
(Continued)

(56) References Cited

U.S. PATENT DOCUMENTS 6,008,559 A * 12/1999 Asano .................. H02K 1/276
  310/216.073
2010/0079024 A1 * 4/2010 Komuro ................ H02K 1/02
  427/127
(Continued)

FOREIGN PATENT DOCUMENTS

| CN | 104410234 | 3/2015 |
| CN | 108667177 | 10/2018 |

(Continued)

OTHER PUBLICATIONS

Machine translation of CN-109617279-A. (Year: 2019).*
(Continued)

*Primary Examiner* — Michael Andrews
(74) *Attorney, Agent, or Firm* — IPUSA, PLLC

(57) ABSTRACT

A rotor includes an iron core; a plurality of permanent magnets housed in magnet slots different from each other formed in the iron core, and arranged in series magnetically; and a flux barrier provided to be close to an end in a direction orthogonal to a direction of a main magnetic flux, for each of at least two permanent magnets among the plurality of permanent magnets arranged in series magnetically. Two instances of the flux barrier corresponding to said at least two permanent magnets arranged in series magnetically, communicate with each other.

6 Claims, 7 Drawing Sheets

(58) Field of Classification Search
USPC .................. 310/156.56, 156.53, 156.57
See application file for complete search history.

(56) References Cited

U.S. PATENT DOCUMENTS

| | | | | |
|---|---|---|---|---|
| 2013/0257190 A1* | 10/2013 | Hamer | ............. | H02K 9/227 |
| | | | | 310/52 |
| 2014/0346911 A1* | 11/2014 | Tsuchida | ............. | H02K 1/246 |
| | | | | 310/156.53 |
| 2016/0285327 A1* | 9/2016 | Sasaki | ............. | H02K 1/246 |
| 2018/0054101 A1 | 2/2018 | Desai et al. | | |
| 2019/0199150 A1 | 6/2019 | Cesa et al. | | |

FOREIGN PATENT DOCUMENTS

| | | | |
|---|---|---|---|
| CN | 108808910 | | 11/2018 |
| CN | 109617279 | | 4/2019 |
| CN | 109617279 A | * | 4/2019 ............. H02K 1/276 |
| JP | H08-336269 | | 12/1996 |
| JP | H11-027883 | | 1/1999 |
| JP | H11-113198 | | 4/1999 |
| JP | 2003-134707 | | 5/2003 |
| JP | 2004-328963 | | 11/2004 |
| JP | 2011-036071 | | 2/2011 |
| JP | 2012-244738 | | 12/2012 |
| JP | 2019-068577 | | 4/2019 |
| JP | 2019068577 A | * | 4/2019 |
| WO | 2013/098912 | | 7/2013 |

OTHER PUBLICATIONS

Machine translation of JP-2019068577-A. (Year: 2019).*
International Search Report for PCT/JP2020/036117 mailed on Nov. 17, 2020.
Extended European Search Report issued on Oct. 27, 2023 with respect to the related European patent application No. 20871232.3.
International Preliminary Report on Patentability for PCT/JP2020/036117 mailed on Apr. 14, 2022.

* cited by examiner

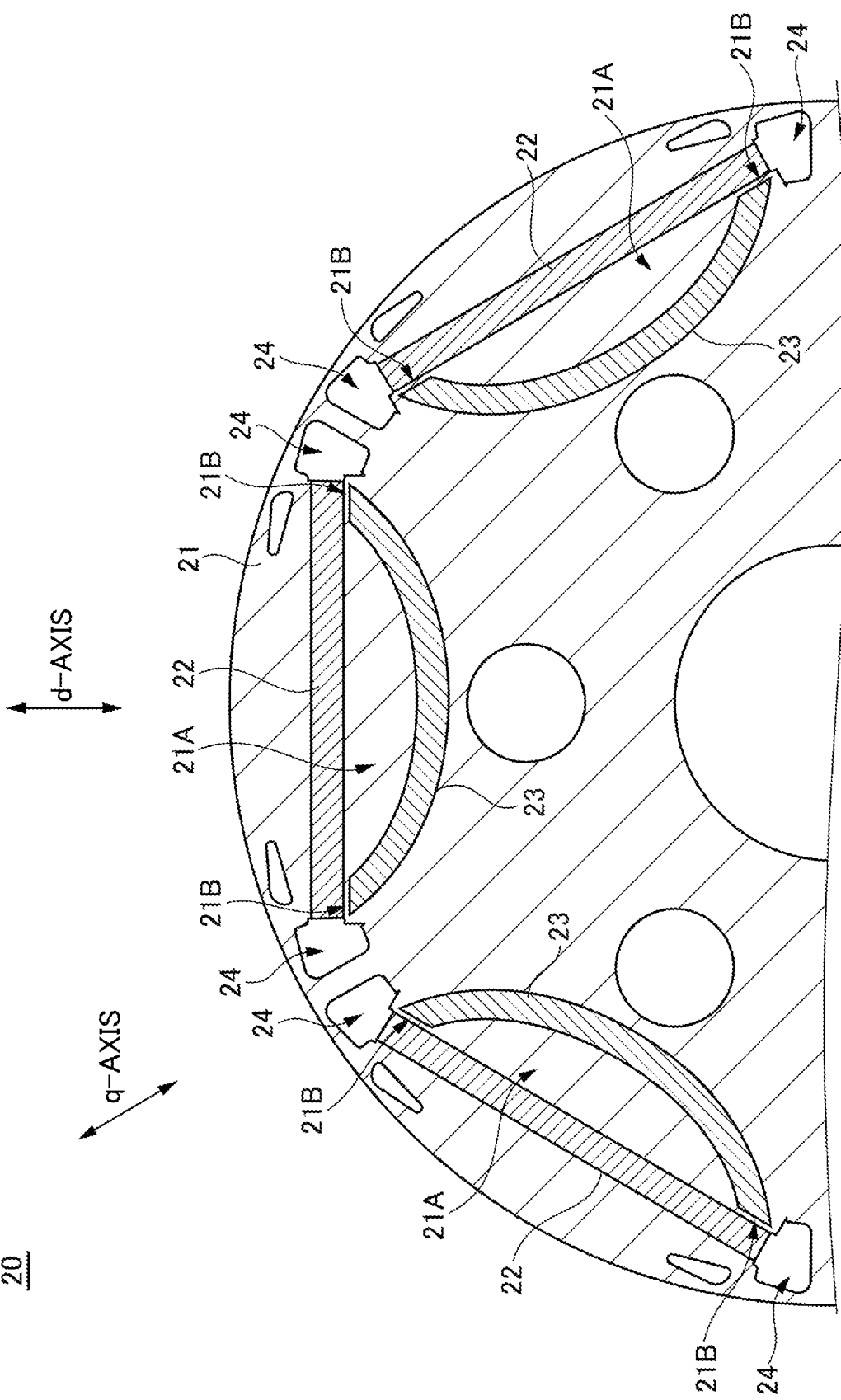

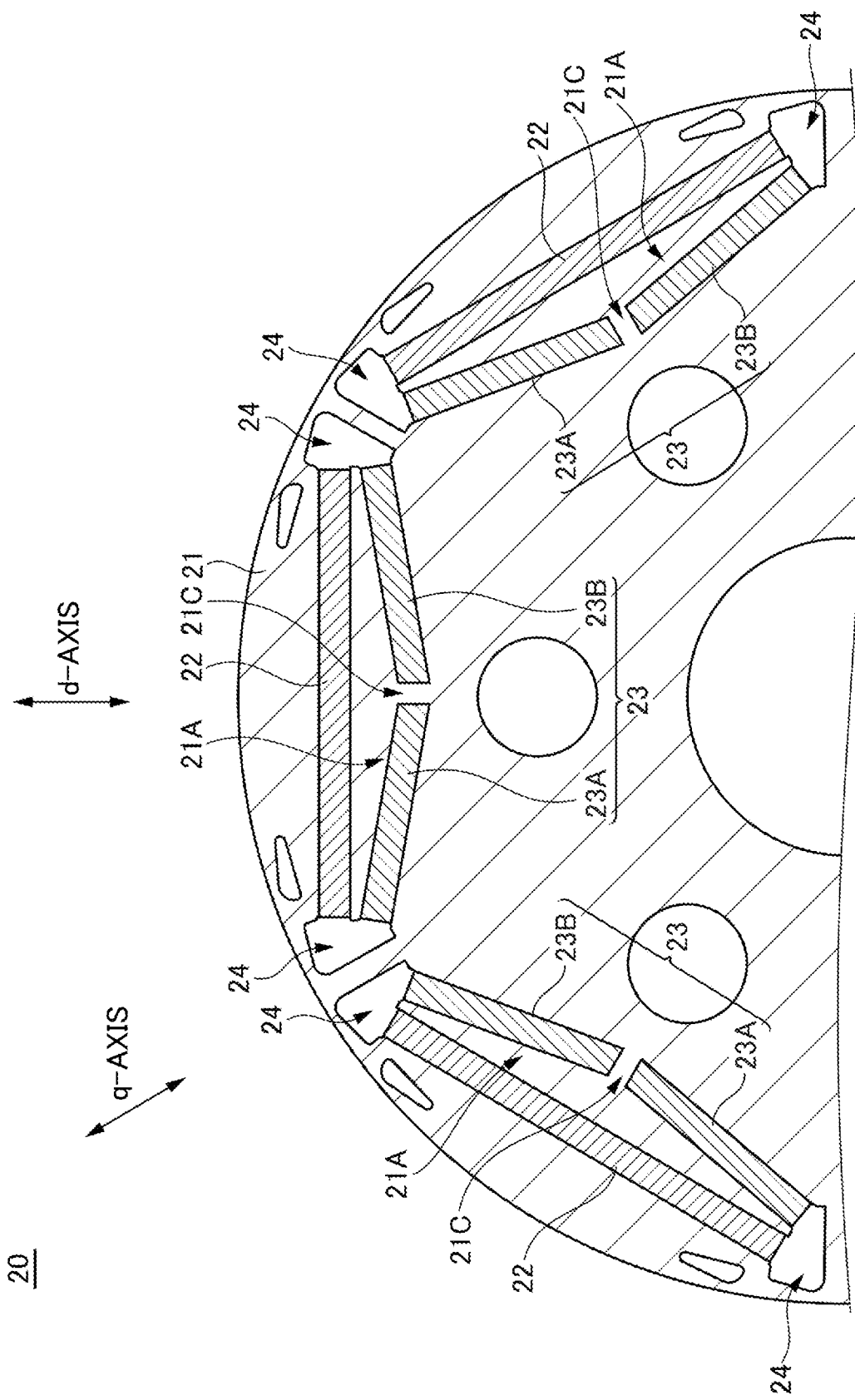

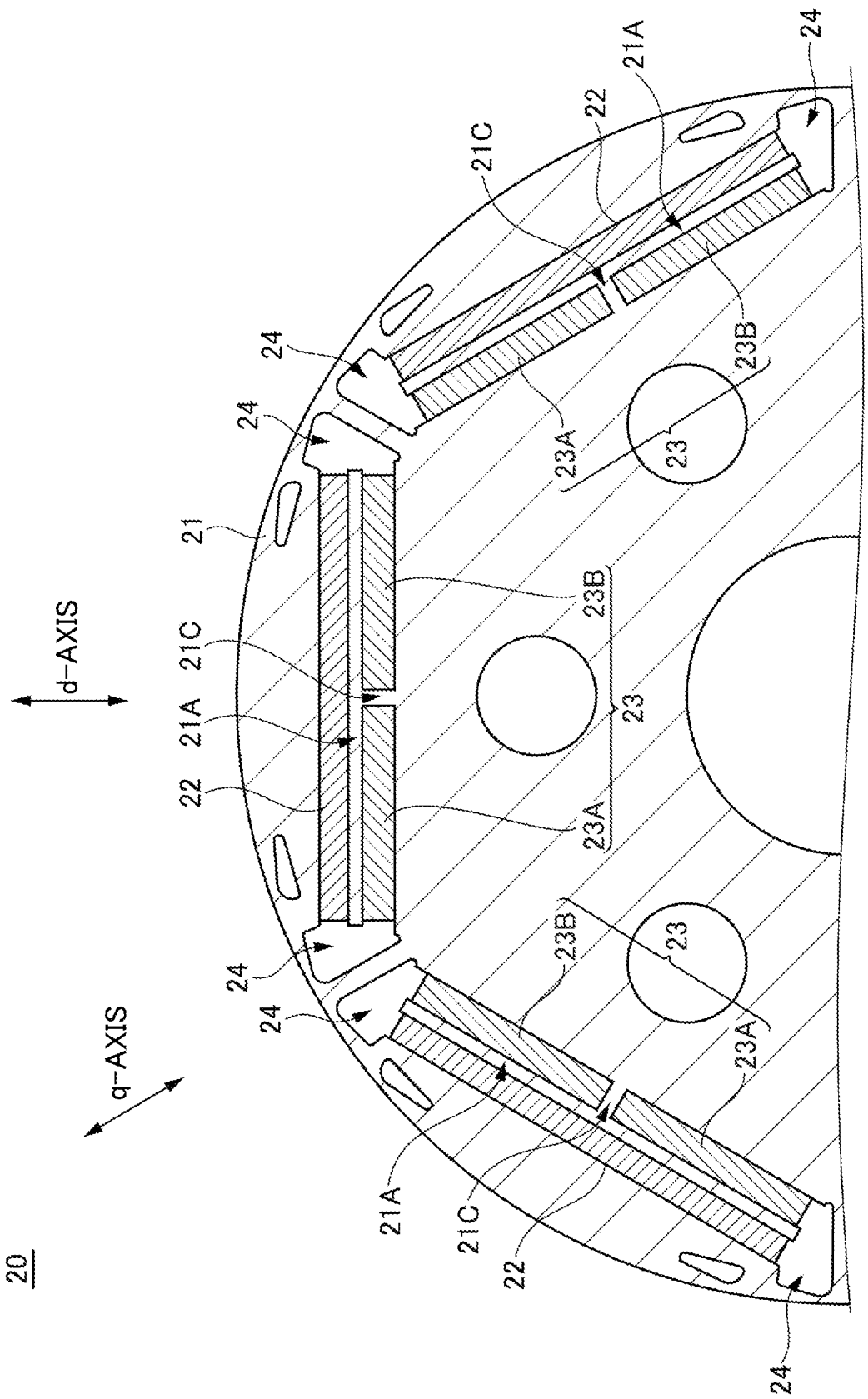

ROTOR WITH PERMANENT MAGNETS HAVING DIFFERENT COERCIVE FORCES

TECHNICAL FIELD

The present disclosure relates to a rotor and a motor.

BACKGROUND ART

For example, techniques have been known that form slits extending in the protruding direction of stator teeth of a stator so as to reduce the d-axis inductance and to increase the reluctance torque (see Patent Document 1).

RELATED ART DOCUMENTS

Patent Documents

[Patent Document 1] Japanese Laid-Open Patent Application No. 2012-244738

SUMMARY OF THE INVENTION

Problem to be Solved by the Invention

However, Patent Document 1 includes no description with respect to a method of reducing the d-axis inductance on the rotor side.

The present disclosure has an object to provide techniques to reduce the d-axis inductance in a rotor.

Means for Solving Problem

In one embodiment according to the present disclosure, a rotor includes
an iron core;
a plurality of permanent magnets housed in magnet slots different from each other formed in the iron core, and arranged in series magnetically; and
a flux barrier provided to be close to an end in a direction orthogonal to a direction of a main magnetic flux, for each of at least two permanent magnets among the plurality of permanent magnets arranged in series magnetically,
wherein two instances of the flux barrier corresponding to said at least two permanent magnets arranged in series magnetically, communicate with each other.

According to the present embodiment, the magnetoresistance in the d-axis direction of a rotor can be increased by multiple permanent magnets that are arranged in series magnetically. Also, the rotor has the flux barriers corresponding to at least two permanent magnets arranged in series magnetically that communicate with each other, and thereby, can suppress a situation such that the magnetic flux at the end of one of the permanent magnets would leak without passing through the other permanent magnet that is connected in series magnetically. Therefore, the rotor can reduce the d-axis inductance.

Also, in the embodiment described above, the plurality of permanent magnets may include a first permanent magnet having a highest coercive force, and a second permanent magnet having a coercive force lower than that of the first the permanent magnet, and
among the plurality of the permanent magnets, the first permanent magnet may be arranged on a circumference side most outward magnetically, and the second permanent magnet is arranged on a circumference side magnetically inward relative to the first permanent magnet.

Also, in the embodiment described above, the plurality of the permanent magnets may be constituted with one magnet member or multiple magnet members that are separated from each other and arranged in parallel magnetically, and
at least one pair of permanent magnets arranged adjacently in series magnetically included in the plurality of permanent magnets may have a total surface area of an outer circumferential surface of the one magnet member or of outer circumferential surfaces of the plurality of magnet members, constituting a permanent magnet located on a circumference side magnetically inward, that is greater than a total surface area of an inner circumferential surface of the one magnet member or of surface areas of inner circumferential surfaces of the plurality of magnet members, constituting a permanent magnet located on a circumference side magnetically outward.

Also, in another embodiment according to the present disclosure, a motor is provided that includes the rotor as described above.

Advantageous Effects of the Invention

According to the embodiments described above, techniques to reduce the d-axis inductance in a rotor can be provided.

BRIEF DESCRIPTION OF THE DRAWINGS

FIG. 5 is a lateral cross-sectional view illustrating a fourth example of a configuration of a rotor;

FIG. 6 is a lateral cross-sectional view illustrating a fifth example of a configuration of a rotor; and FIG. 7 is a lateral cross-sectional view illustrating a sixth example of a configuration of a rotor.

EMBODIMENTS FOR CARRYING OUT THE INVENTION

In the following, embodiments will be described with reference to the drawings.
[Basic Configuration of Motor]
First, with reference to FIG. 1, a configuration of a motor 1 according to the present embodiment will be described.

Figure 1:
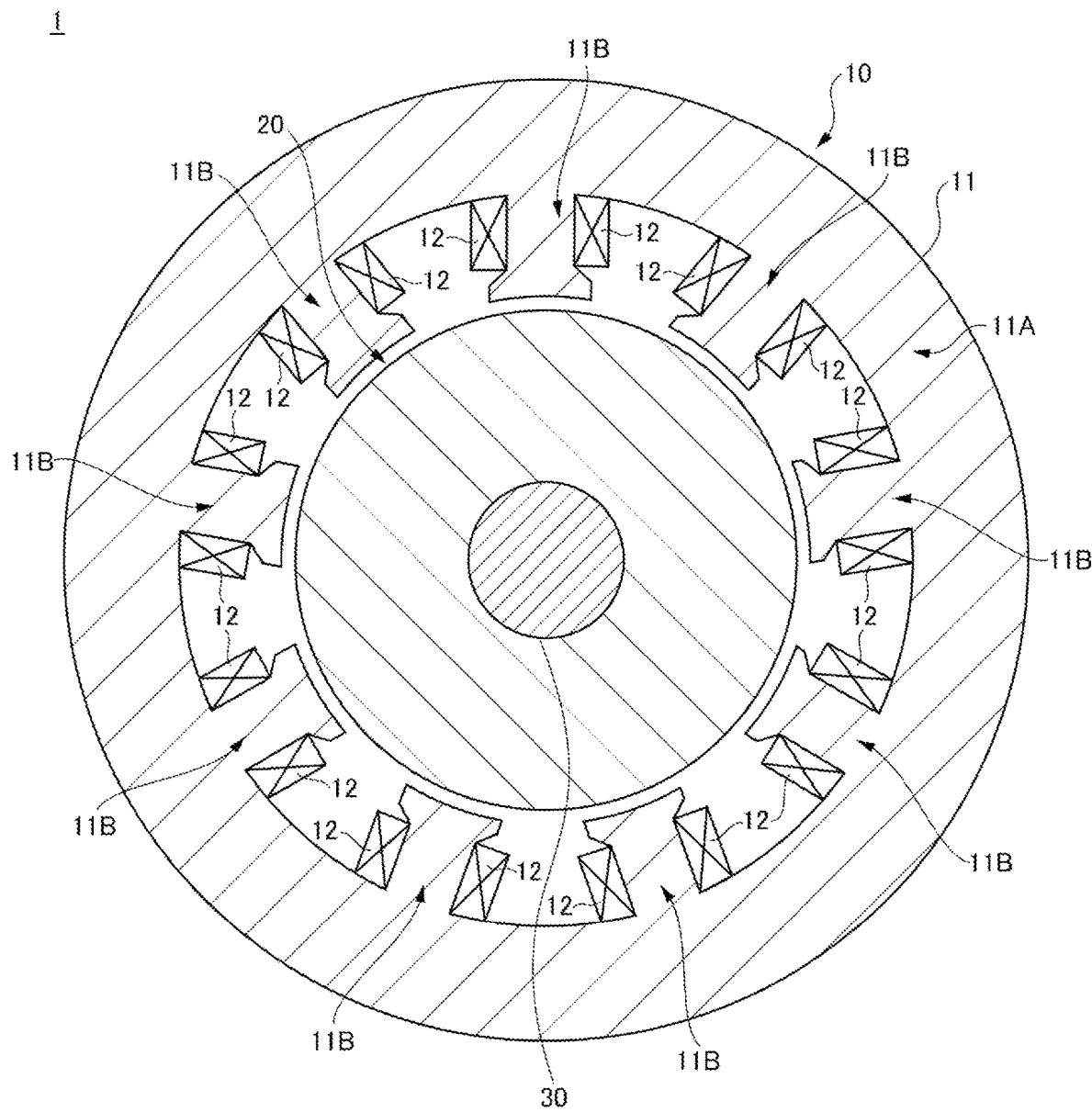
FIG. 1 is a lateral cross-sectional view illustrating an overview of a configuration of a motor.

FIG. 1 is a lateral cross-sectional view of the motor 1 according to the present embodiment.

Note that in FIG. 1, illustration of permanent magnets 22 and 23 is omitted (see FIGS. 2 to 7).

The motor (also referred to as the "electric motor") 1 may be installed, for example, in the compressor of an air conditioner or the like.

As illustrated in FIG. 1, the motor 1 includes a stator 10, a rotor 20, and a rotating shaft 30.

The stator (also referred to as the "stator") 10 is arranged on the outer circumference side of the motor 1, and secured to a housing not illustrated. The stator 10 includes a stator core 11 and a winding wire 12.

The stator core (also referred to as a "stator core") 11 is formed of a material used for a ferromagnetic body, for example, electrical steel, iron dust core, or the like. The stator core 11 includes a back yoke portion 11A having an almost cylindrical shape, and multiple teeth portions 11B (nine portions in the present example) projecting from the inner circumferential surface of the back yoke portion 11A in the radial direction.

Multiple teeth portions 11B are arranged on the inner circumferential surface of the back yoke portion 11A at almost equal intervals in the circumferential direction. Between two adjacent teeth portions 11B in the circumferential direction, a slot (referred to as a "coil slot", hereafter) is formed to accommodate the winding wire 12. In the present example, nine coil slots are formed.

The winding wire 12 is wound around each of the multiple teeth portions 11B by a concentrated winding method. Between the winding wire 12 and the teeth portion 11B, there exists, for example, an insulating member such as an insulating film made of PET (polyethylene terephthalate).

Note that the winding wire 12 may be wound so as to extend over multiple teeth portions 11B by a distributed winding method. Also, the number of the teeth portions 11B, namely, the number of coil slots to be formed between adjacent teeth portions 11B, may be less than or equal to eight, or may be greater than or equal to ten.

The rotor (also referred to as the "rotor") 20 is provided to be rotatable on the inside of the stator 10 in the radial direction.

The rotating shaft 30 is supported to be rotatable with respect to the housing of the motor 1. Accordingly, the rotor 20 fixed to the rotating shaft 30 (the rotor core 21) can rotate with respect to the housing or the stator 10.

[Detailed Configurations of Rotor]

Next, detailed configurations of the rotor 20 will be described with reference to FIGS. 2 to 7.

<First Example of Configuration of Rotor>

Figure 2:
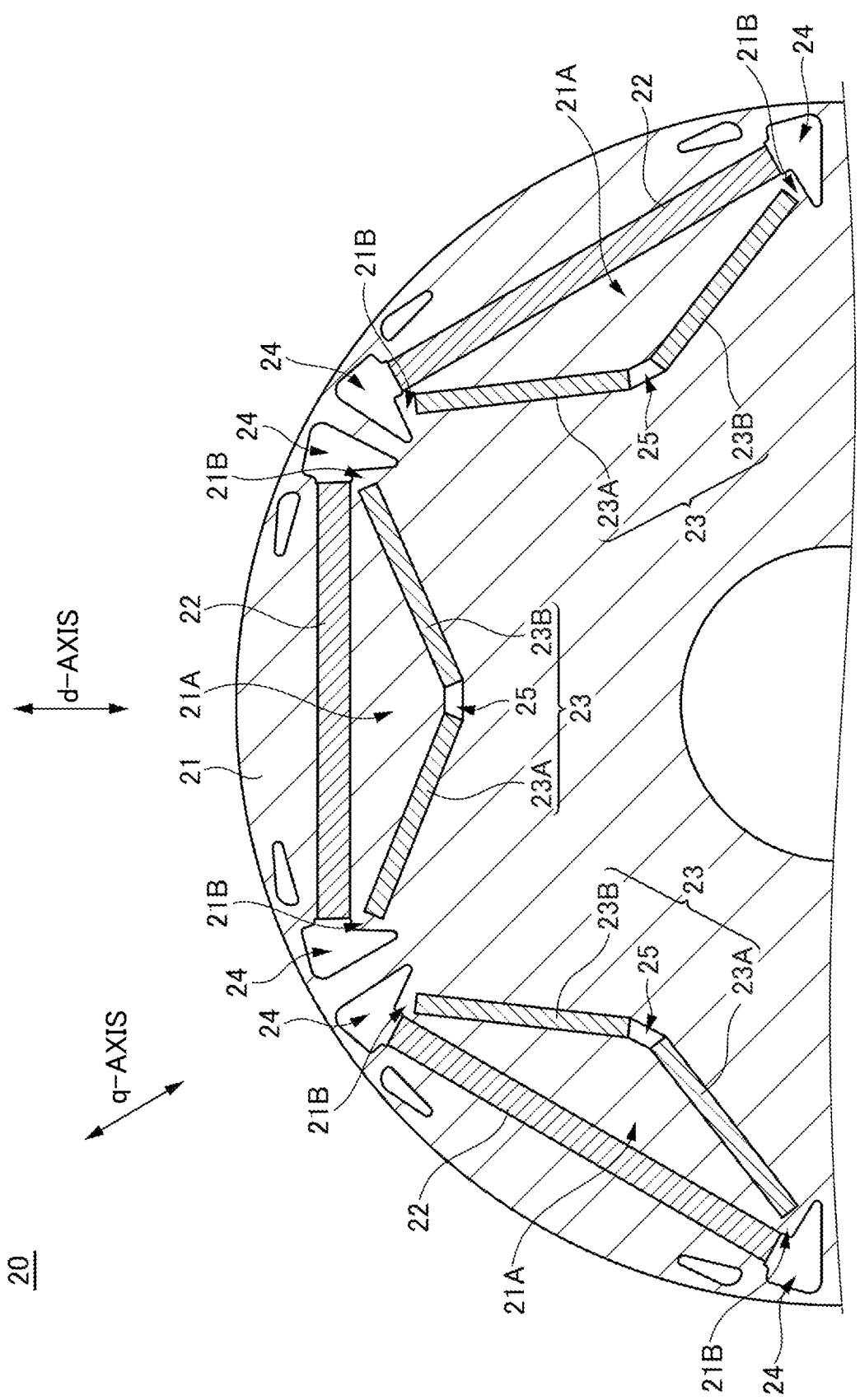
FIG. 2 is a lateral cross-sectional view illustrating a first example of a configuration of a rotor.

FIG. 2 is a lateral cross-sectional view illustrating a first example of a configuration of the rotor 20.

Note that in FIG. 2, a semicircle of a cross section of the rotor 20 that has an almost cylindrical shape is illustrated, in which a portion through which the rotating shaft 30 is inserted hollowed out. In the following, the same applies to FIGS. 3 to 7.

The rotor 20 includes the rotor core 21 and the permanent magnets 22 and 23 embedded in the rotor core 21.

The rotor core (also referred to as the "rotor core") 21 (an example of an iron core) is an element among the components of the rotor 20 that forms a magnetic path in the magnetic field induced by a current flowing through the winding wire of the stator 10, and a magnetic path in the magnetic fields of the permanent magnets 22 and 23. The 'magnetic path' is a region where the magnetic flux passing through when the motor 1 is driven to rotate becomes, for example, one-tenth or greater of the average. The rotor core 21 has an almost cylindrical shape, and is fixed to the rotating shaft 30. The rotor core 21 is formed of a material used for a ferromagnetic body, for example, electrical steel, iron dust core, or the like. The rotor core 21 is provided with spaces (referred to as "magnet slots", hereafter) into which the permanent magnets 22 and 23 are embedded.

Multiple (six in the present example) permanent magnets 22 and multiple (six in the present example) permanent magnets 23 are embedded in the rotor core 21.

Note that the respective numbers of permanent magnets 22 and 23 may be five or fewer, or may be seven or more.

The six permanent magnets 22 are arranged at equal intervals along the circumferential direction, at positions relatively close to the outer circumferential surface of the rotor core 21 in the radial direction.

The six permanent magnets 23 are arranged at positions inward relative to the permanent magnets 22 in the radial direction that are almost the same positions in the circumferential direction of the permanent magnets 22. Accordingly, the permanent magnets 22 and 23 are arranged in the radial direction.

The permanent magnet 22 has a relatively high coercive force. Also, the permanent magnet 22 may have a relatively high magnetic force. The permanent magnet 22 is, for example, a neodymium sintered magnet.

The permanent magnet 23 has a relatively low coercive force. Also, the permanent magnet 23 may have a relatively low magnetic force. The permanent magnet 23 is, for example, a ferrite magnet.

The permanent magnet 22 is constituted with one magnet member. Specifically, the permanent magnet 22 has an almost rectangular shape such that one side as viewed in the shaft direction is sufficiently longer than the other side, and is arranged such that the long side is almost orthogonal to the axis in the radial direction almost at the center. The permanent magnet 22 is magnetized to have different magnetic poles at both ends in the short-side direction.

The permanent magnet 23 includes two magnet members 23A and 23B that are separated.

Specifically, each of the magnet members 23A and 23B has an almost rectangular shape that has one side as viewed in the shaft direction sufficiently longer than the other side. The magnet members 23A and 23B having almost the same elongated rectangular shape are arranged symmetrically to form a V-shape protruding inward in the radial direction, having the axis in the radial direction (d-axis) at the center. Accordingly, the permanent magnet 23 has the V-shape protruding inward in the radial direction, having the axis in the radial direction at the center. Each of the magnet members 23A and 23B is magnetized to have different magnetic poles at both ends in the short-side direction.

Each of the six permanent magnets 22 is arranged such that its magnetic pole magnetized on the side facing the stator 10 is magnetized differently from the magnetic pole of the other permanent magnets 22 arranged adjacently in the circumferential direction. For example, in the case where the side of one permanent magnet 22 facing the stator 10 is magnetized to be the S pole, the side of the other permanent magnets 22 adjacent to the one permanent magnet 22 in the circumferential direction is magnetized to be the N pole.

Each of the six permanent magnets 23 (i.e., six pairs of magnet member 23A and magnet member 235) is arranged such that the pole magnetized on the side facing the permanent magnet 22 at almost the same position in the circumferential direction is different from the pole on the side facing the permanent magnet 23 of the permanent magnet 22. The side of the permanent magnet 22 facing the permanent magnet 23 corresponds to a side opposite to a side facing the stator 10 of the permanent magnet 22. Accordingly, the permanent magnets 22 and 23 are arranged in series magnetically. Also, the magnet members 23A and 23B are arranged in parallel magnetically. Therefore, compared to the case where only one permanent magnet is arranged in the radial direction, the magnetoresistance in the d-axis direction of the motor 1 (the rotor 20) can be increased, and the d-axis inductance Ld can be decreased. Therefore, the saliency ratio (Lq/Ld) corresponding to the ratio of the q-axis inductance Lq to the d-axis inductance Ld can be increased, and thereby, the reluctance torque of the motor 1 can be increased. In particular, in the case where a magnet member 23A and a magnet member 23B having a relatively low coercive force or magnetic force are used as the permanent magnet 23 in the rotor 20, the d-axis inductance Ld can be decreased while curbing the cost increase. In the following, the same applies to the cases of the second example to the sixth example that will be described later.

Also, as described above, among the permanent magnets 22 and 23, the permanent magnet 22 arranged outermost in the radial direction has the highest coercive force, and the permanent magnet 23 arranged inward relative to the permanent magnet 22 has a relatively lower coercive force than the permanent magnet 22. Accordingly, the rotor 20 can suppress demagnetization of the permanent magnets 22 and 23 by the effect of the permanent magnet 22 that has a relatively high coercive force. Also, the cost of the rotor 20 can be reduced by adopting the permanent magnet 23 having a relatively low coercive force. Therefore, by the rotor 20, the cost reduction of the motor 1 can be compatible with suppression of demagnetization of the permanent magnets 22 and 23. In the following, the same applies to the cases of the second example to the sixth example that will be described later.

Also, as described above, the permanent magnet 23 has a V-shape as viewed in the shaft direction. Therefore, the permanent magnet 23 can have a surface area (specifically, the total of the surface areas of the magnet members 23A and 23B) relatively increased as compared to the permanent magnet 22 having an elongated rectangular shape. Therefore, in the rotor 20, the amount of magnetic flux of the field magnet can be increased. In particular, in the case where a magnet member 23A and the magnet member 23B having a relatively low coercive force or magnetic force are used as the permanent magnet 23, the rotor 20 can secure the amount of magnetic flux of the rotor 20 while curbing the cost increase of the motor 1. In the following, the same applies to the third example to the fifth example that will be described later.

Also, as described above, the permanent magnet 22 has an elongated rectangular shape as viewed in the shaft direction, whereas the permanent magnet 23 has a V-shape as viewed in the shaft direction. Accordingly, the surface area of the outer circumferential surface of the permanent magnet 23 (specifically, the total surface area of the outer circumferential surfaces of the magnet members 23A and 23B) is greater than the surface area of the inner circumferential surface of the permanent magnet 22. Therefore, even in the case where the magnetic force (i.e., the magnetic flux density) of the permanent magnet 23 is relatively low, the amount of magnetic flux by the permanent magnet 23 can be increased in the rotor 20, and the magnetic flux of the permanent magnet 22 that does not pass through the permanent magnet 23 can be reduced. Therefore, the rotor 20 can further reduce the d-axis inductance Ld. In the following, the same applies to the third example to the fifth example that will be described later.

Also, as described above, the permanent magnets 22 and 23 arranged at almost the same position in the circumferential direction are embedded in different magnet slots. Accordingly, the centrifugal forces acting on the two permanent magnets 22 and 23 can be received to be distributed on the walls of the corresponding two magnet slots. Therefore, the stress acting on the magnet slot portions of the rotor core 21 can be made relatively smaller compared to the case where the two permanent magnets 22 and 23 are embedded in one magnet slot. Therefore, the reduction of the d-axis inductance Ld by the permanent magnets 22 and 23 can be achieved, while securing the durability for the centrifugal force during high speed operation of the motor 1. Also, for example, unlike the case of embedding the permanent magnets 22 and 23 in the same magnet slot, there is no need to adopt a processing step that would lower the productivity, such as a prior processing step of integrating two permanent magnets 22 and 23; a processing step of inserting two separated permanent magnets 22 and 23 into the same slot; and the like. Therefore, the reduction of the d-axis inductance Ld by the permanent magnets 22 and 23 can be achieved, while suppressing decline of productivity of the motor 1. In the following, the same applies to the cases of the second example to the sixth example that will be described later.

Note that the permanent magnets 22 and 23 may be permanent magnets of the same type, and may have almost the same magnetic force or coercive force.

The magnet slot corresponding to the permanent magnet 22 of the rotor core 21 includes cavities 24.

The cavities 24 are arranged at positions adjacent to both ends of the permanent magnet 22 in the long-side direction, in a state of the permanent magnet 22 being embedded in the magnet slot. The both ends in the long-side direction of the permanent magnet 22 correspond to both ends in a direction orthogonal to the direction of the main magnetic flux generated by the permanent magnet 22. Accordingly, the cavities 24 suppress short circuit of the magnetic flux at the ends in the direction orthogonal to the direction of the main magnetic flux of the permanent magnet 22, and functions as flux barriers. This is because air present in the cavities 24 has a magnetic permeability that is lower than that of the material of the rotor core 21 (e.g., electrical steel and iron dust core).

Also, the cavities 24 extend inward to reach positions in the radial direction that are close to one end and the other end opposite to the one end in the respective long-side directions of a pair of the magnet members 23A and 23B that are adjacent to each other. The one end and the opposite end adjacent to each other along the long-side directions of the pair of the magnet members 23A and 23B, correspond to both ends in the direction orthogonal to the direction of the main magnetic flux generated from the permanent magnet 23. Accordingly, the cavities 24 suppress short circuit of the magnetic flux at the ends in the direction orthogonal to the direction of the main magnetic flux of the permanent magnet 23, and functions as the flux barriers.

The magnet slot corresponding to the permanent magnet 23 of the rotor core 21 includes a cavity 25.

The cavity 25 is arranged (formed) at a portion between opposite ends of the magnet members 23A and 23B (i.e., a portion corresponding to the bottom of the V-shape), in a state of the permanent magnet 23, namely, the magnet members 23A and 23B, being embedded in the magnet slot.

In the rotor core 21, an intermagnet iron core portion 21A surrounded by the permanent magnet 22, the permanent magnet 23, and the cavities 24, is connected to a portion located inward relative to the permanent magnet 23 in the radial direction, through inner rib portions 21B formed between the magnet slot corresponding to the permanent magnet 23 and the cavities 24.

Note that instead of or in addition to at least one of the two inner rib portions 21B, a rib portion may be provided to connect the intermagnet iron core portion 21A to a portion located outward relative to the permanent magnet 22 in the radial direction (referred to as the "outer rib portion", hereafter, for the sake of convenience). In this case, the outer rib portion may be provided between the cavity 24 and an end in a direction orthogonal to the direction of the main magnetic flux of the permanent magnet 22 as in the case of the inner rib portion 21B, or may be provided so as to separate the permanent magnet 22 as in the case of an inner rib portion 21C that will be described later. In this case, it is desirable that the number of inner rib portions 21B is greater than the number of outer rib portions. In the following, the same applies to the cases of the second example to the sixth example that will be described later.

In this way, the cavities 24 are arranged (formed) inside the rotor core 21 so as to have the flux barriers corresponding to the permanent magnet 22 communicate with the flux barriers corresponding to the permanent magnet 23. Accordingly, a situation where the magnetic flux generated at either end of the permanent magnet 22 or the permanent magnet 23 would leak without passing through the other can be suppressed, and the d-axis inductance Ld can be further reduced. In the following, the same applies to the cases of the second example to the sixth example that will be described later.

Note that at least part of the cavity 24 may be replaced with a member having a magnetic permeability lower than that of the material of the rotor core 21 (e.g., a member formed of a non-magnetic material). As in the case of air present in the cavity 24, if the magnetic permeability is lower than the material of the rotor core 21, the material fulfills a function of a flux barrier to suppress short circuit of the magnetic flux. Also, two cavities 24 (flux barriers) corresponding to two adjacent permanent magnets 22 in the circumferential direction do not communicate with each other. In the following, the same applies to the cases of the second example to the sixth example that will be described later.

<Second Example of Configuration of Motor>

Figure 3:
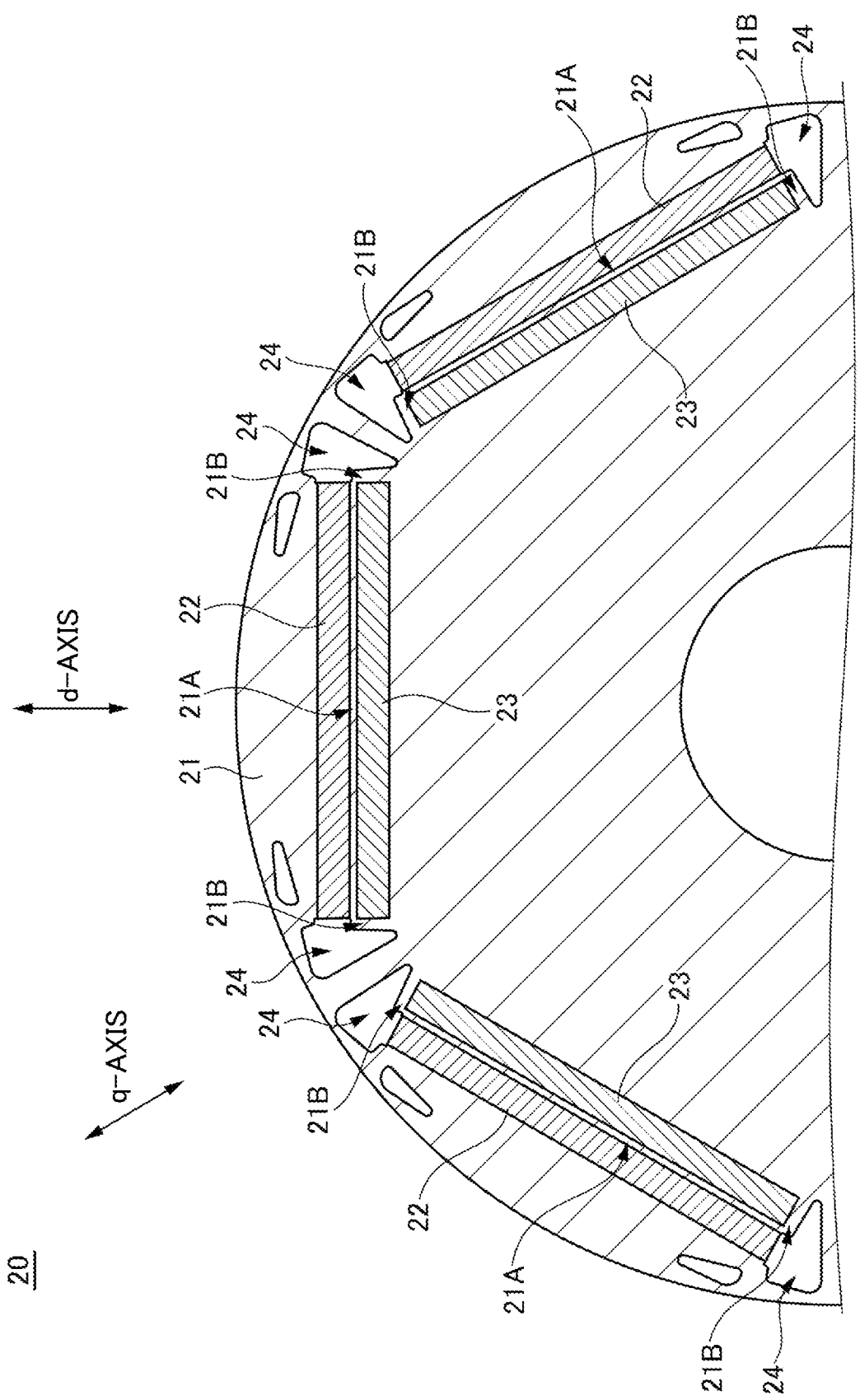
FIG. 3 is a lateral cross-sectional view illustrating a second example of a configuration of a rotor.

FIG. 3 is a lateral cross-sectional view illustrating a second example of a configuration of the rotor 20. In the following, this example will be described mainly in points that are different from the first example escribed above, and the description may be omitted for elements that are the same as or corresponding to those in the first example described above.

As illustrated in FIG. 3, in the present example, as in the case of the first example described above, the permanent magnet 22 is constituted with one magnet member, and has an elongated rectangular shape as viewed in the shaft direction.

Also, in the present example, like the permanent magnet 22, the permanent magnet 23 is constituted with one magnet member. Specifically, like the permanent magnet 22, the permanent magnet 23 has an almost rectangular shape such that one side as viewed in the shaft direction is sufficiently longer than the other side, and is arranged such that the long side is almost orthogonal to the axis in the radial direction almost at the center. Like the permanent magnet 22, the permanent magnet 23 is magnetized to have different magnetic poles at both ends in the short-side direction.

As in the case of the first example described above, the permanent magnets 22 and 23 arranged at almost the same position in the circumferential direction are arranged in series magnetically. Accordingly, by the rotor 20, the d-axis inductance Ld can be decreased as in the case of the first example described above.

Also, as in the case of the first example described above, the cavities 24 are arranged (formed) inside the rotor core 21 so as to have the flux barriers corresponding to the permanent magnet 22 communicate with the flux barriers corresponding to the permanent magnet 23. Accordingly, the d-axis inductance Ld can be further reduced.

Also, in the present example, each of the permanent magnets 22 and 23 is constituted with one magnet member. Accordingly, the number of parts of the permanent magnets 22 and 23 can be reduced. Therefore, by the rotor 20, the d-axis inductance Ld can be decreased while reducing the cost of the motor 1.

<Third Example of Configuration of Motor>

Figure 4:
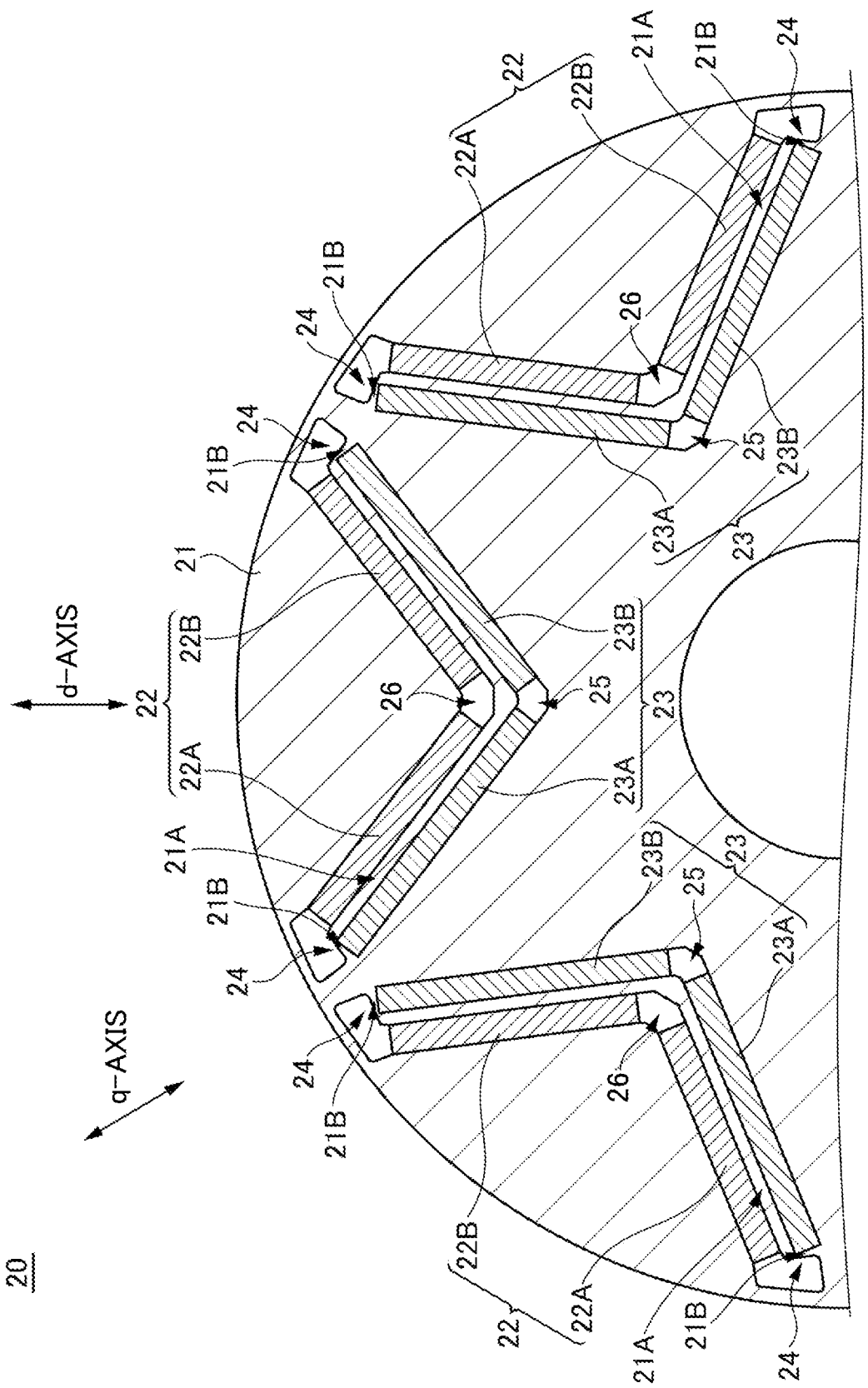
FIG. 4 is a lateral cross-sectional view illustrating a third example of a configuration of a rotor.

FIG. 4 is a lateral cross-sectional view illustrating a third example of a configuration of the rotor 20. In the following, this example will be described mainly in points that are different from the first example and the second example described above, and the description may be omitted for elements that are the same as or corresponding to those in at least one of the first example and the second example.

As illustrated in FIG. 4, in the present example, as in the case of the first example described above, the permanent magnet 23 includes two magnet member 23A and magnet member 23B having almost the same rectangular shape, and are arranged symmetrically to form a V-shape protruding inward in the radial direction, having the axis in the radial direction (d-axis) at the center as viewed in the shaft direction.

Also, in the present example, like the permanent magnet 23, the permanent magnet 22 includes two magnet members 22A and 22B that are separated. Specifically, each of the magnet members 22A and 22B has an almost rectangular shape that has one side sufficiently longer than the other side as viewed in the shaft direction. The magnet members 22A and 22B having almost the same elongated rectangular shape, are arranged symmetrically to form a V-Shape protruding inward in the radial direction, having the axis in the radial direction (d-axis) at the center. Accordingly, like the permanent magnet 23, the permanent magnet 22 has the V-shape protruding inward in the radial direction, having the axis in the radial direction at the center. Each of the magnet members 22A and 22B is magnetized to have different magnetic poles at both ends in the short-side direction. The magnet members 22A and 22B are arranged in parallel magnetically like the magnet members 23A and 23S.

The magnet slot corresponding to the permanent magnet 22 of the rotor core 21 includes a cavity 26.

The cavity 26 is arranged (formed) at a portion between opposite ends of the magnet members 22A and 22S (i.e., a portion corresponding to the bottom of the V-shape), in a state of the permanent magnet 22, namely, the magnet members 22A and 22B, being embedded in the magnet slot.

In the present example, as in the case of the first example and the like described above, the permanent magnets 22 and 23, specifically, the magnet members 22A and 22B and the magnet members 23A and 23B, are arranged at almost the same position in the circumferential direction are arranged in series magnetically. Accordingly, by the rotor 20, the d-axis inductance can be decreased as in the case of the first example and the like described above.

Also, as in the case of the first example and the like described above, the cavities 24 are arranged (formed) inside the rotor core 21 so as to have the flux barriers corresponding to the permanent magnet 22 communicate with the flux barriers corresponding to the permanent magnet 23. Accordingly, the d-axis inductance Ld can be further reduced.

Also, in the present example, in addition to the permanent magnet 23, the permanent magnet 22 has a V-shape as viewed in the shaft direction. Therefore, the permanent magnet 22 can have a surface area (specifically, the total of the surface areas of the magnet member 22A and the magnet member 22B) relatively increased as compared to, for example, a permanent magnet 22 having an elongated rectangular shape. Therefore, in the rotor 20, the magnetic flux amount of the field magnet can be further increased. Also, by forming the permanent magnet 22 to have a V-shape, a portion of the rotor core 21 located outward relative to the permanent magnet 22 in the radial direction is increased. Therefore, in the rotor 20, the q-axis inductance Lq can be increased, and the saliency ratio (Lq/Ld) can be further increased. Therefore, by the rotor 20, the reluctance torque of the motor 1 can be increased, and the output of the motor 1 can be further increased.

<Fourth Example of Configuration of Motor>

FIG. 5 is a lateral cross-sectional view illustrating a fourth example of a configuration of the rotor 20. In the following, this example will be described mainly in points that are different from the first example to the third example described above, and the description may be omitted for elements that are the same as or corresponding to those in at least one of the first example to the third example.

As illustrated in FIG. 5, in the present example, as in the case of the first example described above, the permanent magnet 22 is constituted with one magnet member, and has an elongated rectangular shape.

Also, in the present example, the permanent magnet 23 is constituted with one magnet member, and has a U-shape protruding inward in the radial direction (arc shape), having its center at an axis in the radial direction (d-axis). The permanent magnet 23 is magnetized to have different magnetic poles between the inner surface side and the outer surface side in the thickness direction of the U-shape.

Note that the permanent magnet 23 may include multiple (e.g., three) magnet members to be separated, to have a U-shape by a combination of locations of the multiple magnet members.

In the present example, as in the case of the first example and the like described above, the permanent magnets 22 and 23 arranged at almost the same position in the circumferential direction are arranged in series magnetically. Accordingly, by the rotor 20, the d-axis inductance Ld can be decreased as in the case of the first example and the like described above.

Also, as in the case of the first example and the like described above, the cavities 24 are arranged (formed) inside the rotor core 21 so as to have the flux barriers corresponding to the permanent magnet 22 communicate with the flux barriers corresponding to the permanent magnet 23. Accordingly, the d-axis inductance Ld can be further reduced.

Also, in the present example, as described above, the permanent magnet 23 has a U-shape. Therefore, the permanent magnet 23 can have a surface area relatively increased as compared to the permanent magnet 22 having an elongated rectangular shape. Therefore, in the rotor 20, the magnetic flux amount of the field magnet can be increased. In particular, in the case where the coercive force or magnetic force of the permanent magnet 23 is relatively low, the rotor 20 can secure the magnetic flux amount of the rotor 20 while curbing the cost increase of the motor 1.

Also, as described above, the permanent magnet 22 has an elongated rectangular shape, whereas the permanent magnet 23 has a U-shape. Accordingly, the surface area of the outer circumferential surface of the permanent magnet 23 is greater than the surface area of the inner circumferential surface of the permanent magnet 22. Therefore, even in the case where the magnetic force (i.e., the magnetic flux density) of the permanent magnet 23 is relatively low, the magnetic flux by the permanent magnet 23 can be increased in the rotor 20, and the magnetic flux of the permanent magnet 22 that does not pass through the permanent magnet 23 can be reduced. Therefore, by the rotor 20, the d-axis inductance Ld can be further decreased.

<Fifth Example of Configuration of Rotor>

FIG. 6 is a lateral cross-sectional view illustrating a fifth example of a configuration of the rotor 20. In the following, this example will be described mainly in points that are different from the first example to the fourth example described above, and the description may be omitted for elements that are the same as or corresponding to those in at least one of the first example to the fourth example described above.

As illustrated in FIG. 6, in the present example, as in the case of the first example described above, the permanent magnet 22 is constituted with one magnet member that has an elongated rectangular shape, and the permanent magnet 23 includes magnet members 23A and 23B that are symmetrically arranged in a V-shape protruding inward having the center at the axis of the radial direction.

Also, in the present example, in the rotor core 21, the inner rib portions 21B of the first example described above are omitted, and the cavity 25 is replaced with an inner rib portion 21C.

The inner rib portion 21D (i.e., a portion corresponding to the bottom of the V-shape) is provided between opposite ends of the magnet members 23A and 23B. In the rotor core 21, an intermagnet iron core portion 21A surrounded by the permanent magnet 22, the permanent magnet 23, and the cavities 24, is connected to a portion located inward relative to the permanent magnet 23 in the radial direction, through the inner rib portion 21D. Accordingly, the magnet slot of the permanent magnet 23 is divided into a magnet slot of the magnet member 23A and a magnet slot of the magnet member 23B.

The cavity 24 communicates not only with the magnet slot of the permanent magnet 23, but also with the magnet slot of the permanent magnet 22 (specifically, the magnet slot of the magnet member 23A or the magnet slot of the magnet member 23B). Accordingly, between the magnet member 23A or 23B and the cavity 24 corresponding to the flux barrier, a portion having a relatively high magnetic permeability such as the inner rib portion 21B does not exist at all. Therefore, the function of the cavity 24 as a flux barrier with respect to the permanent magnet 23 (the magnet members 23A and 23B) can be strengthened. Therefore, the rotor 20 can further suppress a situation where the magnetic flux generated at either end of the permanent magnet 22 or the permanent magnet 23 would leak without passing through the other, and can further reduce the d-axis inductance Id.

<Sixth Example of Configuration of Rotor>

FIG. 7 is a lateral cross-sectional view illustrating a sixth example of a configuration of the rotor 20. In the following, this example will be described mainly in points that are different from the first example to the fifth example described above, and the description may be omitted for elements that are the same as or corresponding to those in at least one of the first example to the fifth example described above.

In the present example, as in the case of the fifth example described above, the permanent magnet 22 is constituted with one magnet member, and has an elongated rectangular shape.

Also, in the present example, the permanent magnet 23 includes magnet members 23A and 23B that are arranged symmetrically on almost the same line having the axis of the radial direction at the center, and have an elongated rectangular shape as viewed in the shaft direction.

Between opposite ends of the magnet members 23A and 23B, an inner rib portion 21C is provided as in the fifth example described above. In the rotor core 21, an intermagnet iron core portion 21A surrounded by the permanent magnet 22, the permanent magnet 23, and the cavities 24, is connected to a portion located inward relative to the permanent magnet 23 in the radial direction, through the inner rib portion 21C. Accordingly, the magnet slot of the permanent magnet 23 is divided into a magnet slot of the magnet member 23A and a magnet slot of the magnet member 23B.

As in the case of the fifth example described above, the cavity 24 communicates not only with the magnet slot of the permanent magnet 23, but also with the magnet slot of the permanent magnet 22 (specifically, the magnet slot of the magnet member 23A or the magnet slot of the magnet member 23B). Accordingly, the d-axis inductance Ld can be further reduced.

Other Examples of Configurations of Rotor

The configurations of the first example to the sixth example described above may be combined as appropriate.

For example, in the rotor core 21 in the fourth example described above, the inner rib portion 21B may be omitted as in the case of the fifth example and the sixth example described above, and an inner rib portion 21C may be provided so as to divide the permanent magnet 23 having a U-shape (arc shape) as viewed in the shaft direction into magnet members 23A and 23B.

[Effects]

Next, effects of the rotor 20 according to the present embodiment will be described.

In the present embodiment, the permanent magnets 22 and 23 are housed in different magnet slots formed in the rotor core 21, and are arranged in series magnetically. Also, for each of the permanent magnets 22 and 23 arranged in series magnetically, flux barriers (the cavities 24) are provided adjacent to the ends in a direction orthogonal to the direction of the main magnetic flux. In addition, the cavities 24 are provided in an aspect such that flux barriers corresponding to the respective permanent magnet 22 and the permanent magnet 23 arranged in series magnetically, communicate with each other.

Accordingly, the magnetoresistance in the d-axis direction of the rotor 20 can be increased by the permanent magnets 22 and 23 that are arranged in series magnetically. Also, the rotor 20 has the flux barriers corresponding to the two permanent magnets 22 and 23 arranged in series magnetically that communicate with each other, and thereby, can suppress a situation such that the magnetic flux at the end of one of the permanent magnets would leak without passing through the other permanent magnet that is connected in series magnetically. Therefore, the rotor 20 can reduce the d-axis inductance Ld.

Note that as described above, three or more permanent magnets may be arranged in series magnetically. In this case, not all of the flux barriers corresponding to the permanent magnets need to communicate with each other, and an aspect may be adopted in which the flux barriers corresponding to at least two of the permanent magnets arranged in series magnetically among the three or more the permanent magnets, may communicate with each other.

Also, in the present embodiment, among the permanent magnets 22 and 23, the permanent magnet 22 has the highest coercive force, and the permanent magnet 23 has a lower coercive force than the permanent magnet 22. In addition, the permanent magnet 22 is arranged on a circumference side most outward magnetically, and the permanent magnet 23 is arranged on a circumference side magnetically inward with respect to the permanent magnet 23.

Accordingly, demagnetization of the permanent magnet 23 can be suppressed by the effect of the high coercive force of the permanent magnet 22. Also, by adopting the permanent magnet 23 having a lower coercive force, the cost can be reduced. Therefore, the rotor 20 can suppress demagnetization of the permanent magnet 23, while reducing the cost of the motor 1.

Note that as described above, three or more permanent magnets may be arranged in series magnetically. In this case, the rotor core 21 simply needs to have one permanent magnet having the highest coercive force among three or more permanent magnets, arranged on a circumference side most outward magnetically; and any combination of coercive forces of the other permanent magnets arranged magnetically inward with respect to the one permanent magnet can be adopted discretionarily.

Also, in the present embodiment, each of the permanent magnets 22 and 23 is constituted with one magnet member or multiple magnet members (the magnet member 22A and the magnet member 22B, or the magnet members 23A and 23B) that are separated from each other and arranged in parallel magnetically. In addition, the total surface area of the outer circumferential surface of the one magnet member or of the outer circumferential surfaces of the magnet members 23A and 23B, constituting the permanent magnet 23 located on a circumference side magnetically inward, is greater than the total surface area of the inner circumferential surface of the inner circumferential surface of the one magnet member or of the inner circumferential surfaces of the magnet member 22A and the magnet member 22B, constituting the permanent magnet 22 located on a circumference side magnetically outward.

Accordingly, in the rotor 20, the total surface area of the outer circumferential surface or of the outer circumferential surfaces on the permanent magnet 23 can be increased. Therefore, even in the case where the magnetic force of the permanent magnet 23 located on a circumference side magnetically inward is relatively low, the magnetic flux amount of the rotor 20 can be increased.

Note that as described above, three or more permanent magnets may be arranged in series magnetically. In this case, in the rotor core 21, there is no need to satisfy the relationship described above for all combinations of two permanent magnets arranged adjacently in series magnetically among three or more permanent magnets arranged in series magnetically; it is sufficient that the relationships described above is established for at least one pair.

As above, the embodiments have been described; note that it can be understood that various modifications and changes can be made within the gist and the scope of the subject matter set forth in the claims.

Finally, the present application is based upon and claims the benefit of priority of Japanese Patent Application No. 2019-181001 filed on Sep. 30, 2019, the entire contents of which are hereby incorporated by reference.

LIST OF REFERENCE NUMERALS 1 motor
10 stator 11 stator core
12 winding wire
20 rotor
21 rotor core (iron core)
21A intermagnet iron core portion
21B inner rib portion
21C inner rib portion
22 permanent magnet
22A, 22B magnet member
23 permanent magnet
23A, 23B magnet member
24 cavity (flux barrier)
25 cavity
26 cavity
30 rotating shaft

The invention claimed is:

1. A rotor comprising:
an iron core;
at least three adjacent magnet sets in the rotor that are directly next to each other, wherein each of the adjacent magnet sets respectively includes:
   a plurality of permanent magnets housed in magnet slots different from each other formed in the iron core, and arranged in series magnetically; and
   a flux barrier provided to be close to an end in a direction orthogonal to a direction of a main magnetic flux, for each of at least two permanent magnets among the plurality of permanent magnets arranged in series magnetically, wherein the magnet slots of each of the magnet sets includes a first magnetic slot and a second magnetic slot different from the first magnetic slot for respectively accommodating the at least two permanent magnets,
wherein for each magnet set, the first magnetic slot, the second magnetic slot, the flux barrier provided for one of the at least two permanent magnets and the flux barrier provided for another one of the at least two permanent magnets are interconnected to form a single hole,
wherein the plurality of the permanent magnets of each of the magnet sets include a first permanent magnet accommodated in the first magnetic slot and a second permanent magnet accommodated in the second magnetic slot, the second permanent magnet having a first end surface facing toward a space in the single hole between the first permanent magnet and the second permanent magnet and a second end surface opposite to the first end surface,
wherein the iron core includes an inner rib, the inner rib being in direct contact with the second end surface of the second permanent magnet of each of the magnet sets.

2. The rotor as claimed in claim 1, wherein for each magnet set, the first permanent magnet has a coercive force greater than a coercive force of the second permanent magnet, and
wherein, among the plurality of the permanent magnets of each of the magnet sets, the first permanent magnet is arranged on an outermost circumference side magnetically, and the second permanent magnet is arranged magnetically inward relative to the first permanent magnet.

3. The rotor as claimed in claim 2, wherein each of the plurality of the permanent magnets of each of the magnet sets includes one magnet member, or multiple magnet members that are separated from each other and arranged in parallel magnetically, and
wherein for each magnet set, at least one pair of permanent magnets arranged adjacently in series magnetically included in the plurality of permanent magnets has a total surface area of an outer circumferential surface of the one magnet member or of outer circumferential surfaces of the plurality of magnet members, constituting a permanent magnet located on a circumference side magnetically inward, that is greater than a total surface area of an inner circumferential surface of the one magnet member or of surface areas of inner circumferential surfaces of the plurality of magnet members, constituting a permanent magnet located on a circumference side magnetically outward.

4. The rotor as claimed in claim 1, wherein each of the plurality of the permanent magnets of each of the magnet sets includes one magnet member, or multiple magnet members that are separated from each other and arranged in parallel magnetically, and
wherein for each magnet set, at least one pair of permanent magnets arranged adjacently in series magnetically included in the plurality of the permanent magnets has a total surface area of an outer circumferential surface of the one magnet member or of outer circumferential surfaces of the plurality of magnet members, constituting a permanent magnet located on a circumference side magnetically inward, that is greater than a total surface area of an inner circumferential surface of the one magnet member or of surface areas of inner circumferential surfaces of the plurality of magnet members, constituting a permanent magnet located on a circumference side magnetically outward.

5. A motor, comprising a stator and the rotor as claimed in claim 1, wherein the rotor is disposed in the stator.

6. The rotor as claimed in claim 1, wherein each of the at least two permanent magnets among the plurality of the permanent magnets of each of the magnet sets has an end being in direct contact with the flux barrier of each of the magnet sets.

* * * * *